United States Patent [19]

Kawamura

[11] Patent Number: 4,955,334
[45] Date of Patent: Sep. 11, 1990

[54] CONTROL APPARATUS FOR VALVE DRIVEN BY ELECTROMAGNETIC FORCE

[75] Inventor: Hideo Kawamura, Samukawa, Japan
[73] Assignee: Isuzu Motors Limited, Tokyo, Japan
[21] Appl. No.: 454,959
[22] Filed: Dec. 22, 1989
[30] Foreign Application Priority Data Dec. 28, 1988 [JP] Japan .................. 63-334969

[51] Int. Cl.$^5$ .............................................. F01L 9/04
[52] U.S. Cl. ................... 123/90.11; 251/129.1; 361/153; 361/169.1; 123/90.24
[58] Field of Search .......... 123/90.11, 90.24, 188 AA; 251/129.05, 129.1; 361/147, 153, 154, 169.1

[56] References Cited

U.S. PATENT DOCUMENTS

| | | | |
|---|---|---|---|
| 3,682,152 | 8/1972 | Muller-Berner | 123/90.11 |
| 4,148,090 | 4/1979 | Kawai et al. | 361/154 |
| 4,180,026 | 12/1979 | Schulzke et al. | 361/154 |
| 4,312,494 | 1/1982 | Aoyama | 123/90.11 |
| 4,544,986 | 10/1985 | Buchl | 123/90.11 |
| 4,614,170 | 9/1986 | Pischinger et al. | 123/90.11 |
| 4,829,947 | 5/1989 | Lequesne | 251/129.1 |
| 4,841,923 | 6/1989 | Buchl | 251/129.1 |
| 4,846,120 | 7/1989 | Buchl | 123/90.11 |
| 4,883,025 | 11/1989 | Richeson, Jr. | 123/90.11 |

FOREIGN PATENT DOCUMENTS

| | | | |
|---|---|---|---|
| 183805 | 10/1983 | Japan | 123/90.11 |
| 195004 | 11/1983 | Japan | 123/90.11 |
| 162312 | 9/1984 | Japan | 123/90.11 |

Primary Examiner—Willis R. Wolfe
Assistant Examiner—Weilun Lo
Attorney, Agent, or Firm—Staas & Halsey

[57] ABSTRACT

An apparatus for controlling a valve driven by electromagnetic force is adapted to sense the amount of bounce of a valve when the valve is seated, whereby a force in the valve seating direction is applied to the valve immediately after it is seated, thereby controlling the bounce force in accurate fashion. The apparatus is provided with memory means for storing the driving force applied by drive control means, and arithmetic means for deciding, in accordance with the driving force stored in the memory, a force acting in the valve lifting direction until immediately before the valve is seated, and a force immediately after the valve is seated. Control of driving force conforming to conditions such as engine rotation is thus learned so that the proper deceleration control can be performed at all times.

5 Claims, 2 Drawing Sheets

CONTROL APPARATUS FOR VALVE DRIVEN BY ELECTROMAGNETIC FORCE

BACKGROUND OF THE INVENTION

1. (Field of the Invention)

This invention relates to a control apparatus for an electromagnetic force-driven valve, which apparatus opens and closes the suction/exhaust valve of an engine by an electromagnetic force produced by an electromagnet.

2. (Description of the Prior Art)

In an ordinary engine, a valve is controlled to open and close so that a cylinder may perform a suction/exhaust operation.

In one example of a drive apparatus for opening and closing such a suction/exhaust valve, a cam shaft, which is obtained by disposing cams for suction and exhaust on one shaft, is provided on the upper portion of the engine or on one side face thereof. A crankshaft, which is the rotary shaft of the engine, and the cam shaft are connected by rotary transmission means such as a belt, and the cam shaft is driven rotatively in synchronism with the rotational phase of the engine. The axial end face of the valve is pushed by the cam face of the cam shaft via a link mechanism such as a rocker arm or pushing rod. The suction/exhaust valve normally is held in the closed state by a spring and its axial end face is opened by being pushed.

In another example of a drive apparatus for opening and closing a suction/exhaust valve, a suction cam shaft having a suction cam and an exhaust cam shaft having an exhaust cam are disposed on the upper portion of an engine, the cam face of the suction cam shaft pushes the axial end face of the suction valve directly, and the cam face of the exhaust cam shaft pushes the axial end face of the exhaust valve directly, thereby opening the suction-/exhaust valve.

This conventional drive apparatus for opening and closing the suction/exhaust valve results in a large-size engine because the cam shaft and link mechanism must be added onto the engine. Furthermore, since the cam shaft and link mechanism are driven by the output shaft of the engine, some of the engine output is consumed by frictional resistance when the cam shaft and link mechanism are driven. This diminishes the effective output of the engine.

Further, the actuation timing of the suction/discharge valve cannot be altered during engine operation. Since the valve actuation timing is adjusted so as to attain high efficiency in a case where the engine is running at a prescribed rpm, engine efficiency declines when it is running at an rpm different from the prescribed rpm.

In order to solve the foregoing problems, an apparatus for driving a suction/exhaust valve to open and close the same by electromagnetic force from an electromagnet, without relying upon a cam shaft, has been disclosed in Japanese Patent Application Laid-Open (KOKAI) Nos. 58-183805 and 61-76713.

The applicant has filed an application relating to an electromagnetic force-driven valve control apparatus adapted to increase engine output when the engine is rotating and low speed, and to improve fuel economy (Japanese Patent Application No. 63-264831). When the valve is controlled by such an electromagnetic force, the valve strikes the cylinder head and bounces back after being seated if the engine is rotating at high speed. Such valve bounce results in diminished fuel economy and unstable engine rotation and is an impediment to high-speed rotation of the engine. For these reasons, accurately sensing engine speed, the amount of valve jump relative to the cylinder and valve open/close timing is essential in order to drive the engine efficiently and stably.

However, the conventional control apparatus for the electromagnetic-force driven valve is adapted to apply, immediately before valve seating, corrective acceleration in the valve-lift direction, namely in the opposite direction, with respect to the driving force acting in the valve-seating direction and stipulating the period during which the valve is in the open state, thereby reducing valve velocity to suppress the amount of jump relative to the cylinder. Consequently, the bounce force differs depending upon the state of the engine load and the engine rotational speed, as a result of which proper deceleration control cannot be achieved.

The present invention has been devised in order to solve the foregoing problems and its object is to provide an electromagnetic force-driven valve control apparatus whereby the open/closed state of an electromagnetically driven valve is sensed reliably to make it possible to accurately control the bounce force acting upon the lifting side even at the time of high-speed rotation.

SUMMARY OF THE INVENTION

According to the present invention, the foregoing object is attained by providing an electromagnetic force-driven valve control apparatus characterized by having sensing means for sensing amount of bounce when the valve is seated, and drive control means for applying, based on the amount of bounce of the valve, a force in the valve-seating direction immediately after seating.

Features and advantages of the present invention will be apparent from the following description taken in conjunction with the accompanying drawings.

DESCRIPTION OF THE PREFERRED EMBODIMENT

An embodiment of the present invention will now be described in detail with reference to the drawings.

Figure 1:
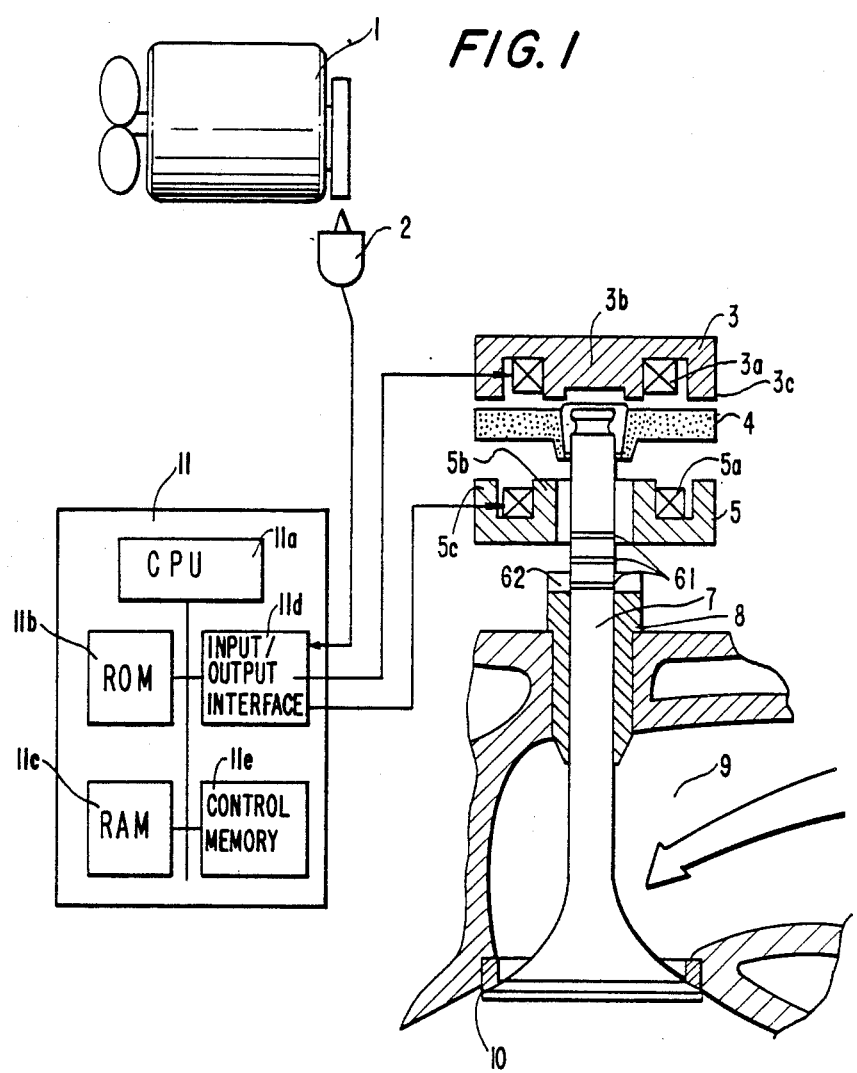
FIG. 1 is a block diagram illustrating an embodiment of the present invention.

FIG. 1 is a block diagram illustrating an electromagnetic force-drive valve control apparatus according to the present invention.

Numeral 1 denotes an engine having an output shaft in the proximity of which is disposed a rotation sensor 2 for sensing the rotational speed and rotational phase of the output shaft and converting these quantities into signals. Among the suction/exhaust valves which control the opening and closing of the suction/exhaust ports of the engine 1, the following discussion will deal primarily with only a single suction valve 7. The valve 7 is controlled for up-and-down movement at a predetermined velocity by drive mechanisms 3–5, described below, and has valve position detecting means for detecting its position.

The suction valve 7, which is shown in the open state, is constituted by a light-weight valve having a high strength and consisting of a non-magnetic material such as a ceramic. The shaft portion of the suction valve 7 is supported by a valve guide 8 so as to be freely movable in the axial direction. A valve seat 10 is disposed at a suction port of an intake conduit 9, and the suction port is closed by bringing the bevel-shaped portion of the suction valve 7 into intimate contact with the valve seat 10. A band-shaped movable electrode 61 split into a plurality of segments is imbedded in the shaft support portion of the suction valve 7, and the corresponding valve guide 7 is provided with a fixed electrode 62 for detecting the position of the movable electrode. The valve position detecting means is constituted by these electrodes 61, 62. A permanent magnet 4 molded into an annular shape is connected to the axial end face of the suction valve 7. The inner circumferential side of the permanent magnet 4 is an S pole, and its outer circumferential side is an N pole.

A circular upper electromagnet 3 is disposed at a position a minute distance above the upper end face of the permanent magnet 4 when the suction valve 7 is in the closed state, and an annular lower electromagnet magnet 5 is disposed at a position a minute distance below the lower end face of the permanent magnet 4 when the suction valve 7 is in the open state. An inner magnetic pole 3b provided at the central portion of the upper electromagnet 3 opposes the S pole constituting the inner circumferential side of the permanent magnet 4, and an outer pole 3c provided on the outer circumferential portion of the upper electromagnet 3 opposes the N pole constituting the outer circumferential portion of the permanent magnet 4. An inner magnetic pole 5b provided on the inner circumferential side of the lower electromagnet 5 opposes the S pole constituting the inner circumferential side of the permanent magnet 4, and an outer pole 5c provided on the outer circumferential portion of the lower electromagnet 5 opposes the N pole constituting the outer circumferential portion of the permanent magnet 4. These upper and lower electromagnets 3 and 5 are respectively provided with an upper coil 3a and a lower coil 5a.

The rotation sensor 2, upper coil 3a and lower coil 5a are connected to an input/output interface 11d within a control unit 11. Also provided within the control unit 11 in addition to the input/output interface 11d, which is for signal input/output relative to external apparatus, are a ROM 11b which stores control data for controlling drive output conforming to such conditions as engine rotation, as well as program data, a CPU 11a which performs processing under the control of the program stored in the ROM 11b, a RAM 11c for temporarily storing input signals and learned results regarding driving force before and after valve seating, and a control memory 11e for controlling the flow of signals within the control unit 11.

Figure 2:
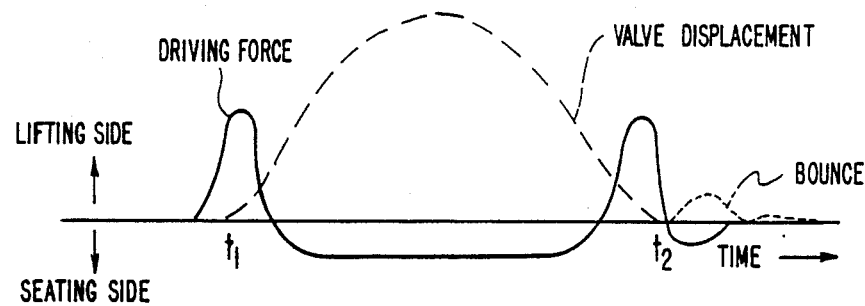
FIG. 2 is a control characteristic diagram illustrating driving force applied to a valve.

FIG. 2 is a control characteristic diagram in which the action of driving force upon the suction valve 7 is illustrated, with the horizontal axis serving as a time axis. The magnitude of driving force, which varies on the lifting side and seating side, is indicated by the solid line, and valve position is indicated by the broken line.

When the suction/exhaust valve of an engine is driven to open and close by electromagnetic forces from two fixed electromagnets, a large driving force acts upon the lifting side to rapidly open the valve at a time $t_1$, which is when the valve makes a transition from the closed to the open state. Thereafter, driving force on the seating side is maintained in dependence upon engine load and rotational speed. At time $t_2$, which is when the valve is seated, a driving force again acts upon the lifting side to diminish bounce which accompanies seating. Here, immediately after the valve is seated, a driving force in the seating direction is again applied to cancel out the bounce which occurs at this time (this bounce is indicated by the dotted line in FIG. 2). The arrangement is such that this driving force in the seating direction applied immediately after seating is adjusted in dependence upon the magnitude of the amount of bounce detected by the valve position detecting means.

Figure 3:
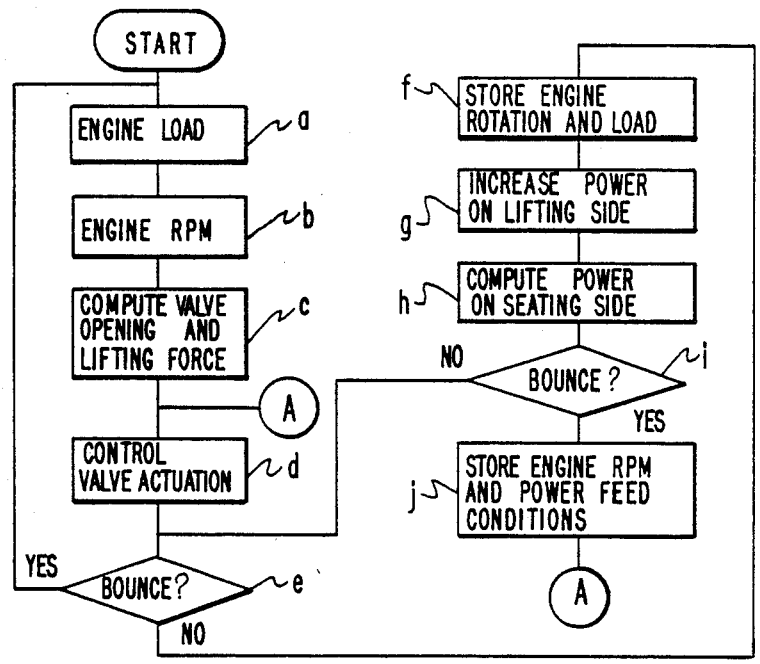
FIG. 3 is an operation flowchart for describing the operation of the apparatus of the embodiment.

FIG. 3 is an operation flowchart for describing the operation of the apparatus according to the foregoing embodiment.

With the starting of the engine, engine load and rpm are sensed by the respective sensors (steps a, b), and a valve driving force (lifting force) conforming to the required valve opening is computed (step c). The valve is controlled to open and close by a driving force conforming to the actual speed and position of the valve (step d). When bounce of the valve at seating is detected by the valve position detecting means (step e), the engine load and rpm at this time are stored (step f), the force acting in the lifting direction is increased until just before seating in the next cycle (step g), and a corresponding force which will prevail immediately after seating is decided (step h).

At the moment it is determined at step i that bounce of the suction valve 7 has been completely suppressed, the program proceeds to step j. Here the learned driving force is stored in memory, in which state the program proceeds to step d.

Though an embodiment of the present invention has been described primarily with regard to a suction valve, it is obvious that the drive apparatus according to the invention can be similarly applied to an exhaust valve.

As many apparently widely different embodiments of the present invention can be made without departing from the spirit and scope thereof, it is to be understood that the invention is not limited to the specific embodiments thereof except as defined in the appended claims.

What is claimed is:

1. An electromagnetic force-driven valve control apparatus for opening and closing a suction/exhaust valve upon sensing rotational speed and rotational phase of an engine output shaft, comprising:

sensing means for sensing position of the valve controlled to move up and down at a predetermined speed, and for sensing amount of bounce of the valve when the valve is seated;

drive control means for applying, based on the amount of bounce of the valve, a driving force in a seating direction immediately after seating;

memory mean for storing the driving force applied by said drive control means; and arithmetic means for deciding, in accordance with the driving force stored in said memory, a force acting in a valve lifting direction until immediately before the valve is seated, and a force immediately after the valve is seated.

2. The control apparatus according to claim 1, wherein said drive control means includes:

a permanent magnet connected to an axial end portion of said valve;

an upper electromagnetic valve disposed at a position a minute distance above an upper end face of the permanent magnet when said valve is in a closed state; and a lower electromagnet magnet disposed at a position a minute distance below a lower end face of the permanent magnet when said valve is in an open state.

3. The control apparatus according to claim 2, wherein said permanent magnet is annular in shape.

4. The control apparatus according to claim 2, wherein a pair of magnetic poles of said electromagnet oppose respective ones of N and S poles of a movable permanent magnet.

5. The control apparatus according to claim 1, wherein said suction/exhaust valve is composed of a ceramic.

* * * * *